(12) United States Patent
Verbrugge et al.

(10) Patent No.: US 9,583,767 B2
(45) Date of Patent: Feb. 28, 2017

(54) METHODS FOR MAKING BATTERY ELECTRODE SYSTEMS

(75) Inventors: Mark W. Verbrugge, Troy, MI (US);
Tao Xie, Troy, MI (US); Hamid G. Kia, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1353 days.

(21) Appl. No.: 13/344,539

(22) Filed: Jan. 5, 2012

(65) Prior Publication Data

US 2013/0177804 A1 Jul. 11, 2013

(51) Int. Cl.
*H01M 4/62* (2006.01)
*H01M 4/64* (2006.01)
*H01M 4/04* (2006.01)

(52) U.S. Cl.
CPC ............ *H01M 4/622* (2013.01); *H01M 4/04* (2013.01)

(58) Field of Classification Search
CPC ............ H01M 4/62; H01M 4/64; H01M 4/66
USPC ..................... 429/211, 232, 231.5
See application file for complete search history.

(56) References Cited

U.S. PATENT DOCUMENTS

2006/0093873 A1* 5/2006 Howard et al. ............... 429/9
2008/0268348 A1* 10/2008 Katoh ........................ 429/323
2010/0310965 A1* 12/2010 Nakai et al. ................ 429/483

FOREIGN PATENT DOCUMENTS

JP 2003017040 A * 1/2003

OTHER PUBLICATIONS

Sides et al., "Nanoscale Materials for Lithium-Ion Batteries", MRS Bulletin, Aug. 2002, pp. 604-607.
Che et al., "Carbon Nanotubule Membranes for Electrochemical Energy Storage and Production", Letters to Nature, vol. 393, May 28, 1998, pp. 346-349.
Chan et al., "High-Performance Lithium Battery Anodes Using Silicon Nanowires", Nature Nanotechnology, vol. 3, Jan. 2008, pp. 31-35.
Krishnan et al., "Functionally Strain-Graded Nanoscopes for High Power Li-Ion Battery Anodes", Nanoletters, www.pubs.acs.org. NanoLett, 23 pages.

* cited by examiner

*Primary Examiner* — Daniel Gatewood
(74) *Attorney, Agent, or Firm* — Dierker & Kavanaugh, P.C.

(57) ABSTRACT

Methods for making battery electrode system are disclosed herein. In an example of the method, a mixture of a polymer binder, an active material and a conductive filler is deposited on a current collector. The deposited mixture is exposed to an external field having a field direction that is normal to a surface of the current collector. The exposure aligns, outward from and normal to the surface of the current collector, the active material and the conductive filler to form a plurality of discrete structures that extend outward from and normal to the surface of the current collector and are respectively aligned with a field line of the external field. Each of the plurality of discrete structures includes some of the active material and some of the conductive filler.

13 Claims, 3 Drawing Sheets

METHODS FOR MAKING BATTERY ELECTRODE SYSTEMS

TECHNICAL FIELD

The present disclosure relates generally to methods for making battery electrode systems.

BACKGROUND

Secondary, or rechargeable, lithium ion batteries are used in many stationary and portable devices, such as those encountered in the consumer electronic, automobile, and aerospace industries. The lithium ion class of batteries has gained popularity for various reasons including a relatively high energy density, a general nonappearance of any memory effect when compared to other kinds of rechargeable batteries, a relatively low internal resistance, and a low self-discharge rate when not in use.

A lithium ion battery generally operates by reversibly passing lithium ions between a negative electrode (i.e., anode) and a positive electrode (i.e., cathode). The negative and positive electrodes are situated on opposite sides of a microporous polymer separator that is soaked with an electrolyte solution suitable for conducting lithium ions. Each of the negative and positive electrodes is also accommodated by a current collector. The current collectors associated with the two electrodes are connected by an interruptible external circuit that allows an electric current to pass between the electrodes to electrically balance the related migration of lithium ions. Further, the negative electrode may include a lithium intercalation host material, and the positive electrode may include a lithium-based active material that can store lithium ions at a higher electric potential than the intercalation host material of the negative electrode. The electrolyte solution may contain a lithium salt dissolved in a non-aqueous solvent.

A lithium ion battery, or a plurality of lithium ion batteries that are connected in series or in parallel, can be utilized to reversibly supply power to an associated load device. A brief discussion of a single power cycle beginning with battery discharge follows.

To begin, during discharge, the negative electrode of a lithium ion battery contains a high concentration of intercalated lithium while the positive electrode is relatively depleted. The establishment of a closed external circuit between the negative and positive electrodes under such circumstances causes the extraction of intercalated lithium from the negative anode. The extracted lithium is then split into lithium ions and electrons. The lithium ions are carried through the micropores of the interjacent polymer separator from the negative electrode to the positive electrode by the ionically conductive electrolyte solution while, at the same time, the electrons are transmitted through the external circuit from the negative electrode to the positive electrode (with the help of the current collectors) to balance the overall electrochemical cell. This flow of electrons through the external circuit can be harnessed and fed to a load device until the level of intercalated lithium in the negative electrode falls below a workable level or the need for power ceases.

The lithium ion battery may be recharged after a partial or full discharge of its available capacity. To charge or re-power the lithium ion battery, an external power source is connected to the positive and the negative electrodes to drive the reverse of battery discharge electrochemical reactions. That is, during charging, the external power source extracts the lithium present in the positive electrode to produce lithium ions and electrons. The lithium ions are carried back through the separator by the electrolyte solution, and the electrons are driven back through the external circuit, both towards the negative electrode. The lithium ions and electrons are ultimately reunited at the negative electrode, thus replenishing it with intercalated lithium for future battery discharge.

The ability of lithium ion batteries to undergo such repeated power cycling over their useful lifetimes makes them an attractive and dependable power source.

SUMMARY

Methods for making battery electrode systems are disclosed herein. In an example of the method, a mixture of a polymer binder, an active material, and a conductive filler is deposited on a current collector. The deposited mixture is exposed to an external field having a field direction that is normal to a surface of the current collector. The exposure aligns, outward from and normal to the surface of the current collector, the active material and the conductive filler to form a plurality of discrete structures that extend outward from and normal to the surface of the current collector and are respectively aligned with a field line of the external field. Each of the plurality of discrete structures includes some of the active material and some of the conductive filler.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

In an electrode, when resistance to electron transport dominates, reactions take place closer to the current collector adjacent to the electrode. Electron resistance increases with the electron path length and the cross-sectional area of the electrode. As such, the current distribution within an electrode may be altered by altering the dimensions of the electrode. It is believed that examples of the method disclosed herein enable one to easily vary the electrode geometry via modulation of an external field. In turn then, it is believed that the examples of the method disclosed herein allow one to rapidly optimize the electronic to ionic resistance in the final electrode application.

Examples of the method disclosed herein include the application of an external field to align active materials and conductive materials present in a mixture including a polymer binder. The external field has a field direction that is normal to a surface of a current collector upon which the mixture is deposited. The active materials and conductive materials are responsive to the external field and align in the field direction. As such, utilizing the method(s) disclosed herein, discrete active and conductive structures are formed having a solid phase that extends outward from and normal to the current collector. The resulting structures have an anisotropic morphology that advantageously constricts the transport (performance) of the electrode in the direction normal to the current collector surface.

Figures 1A, 1B, 1C:
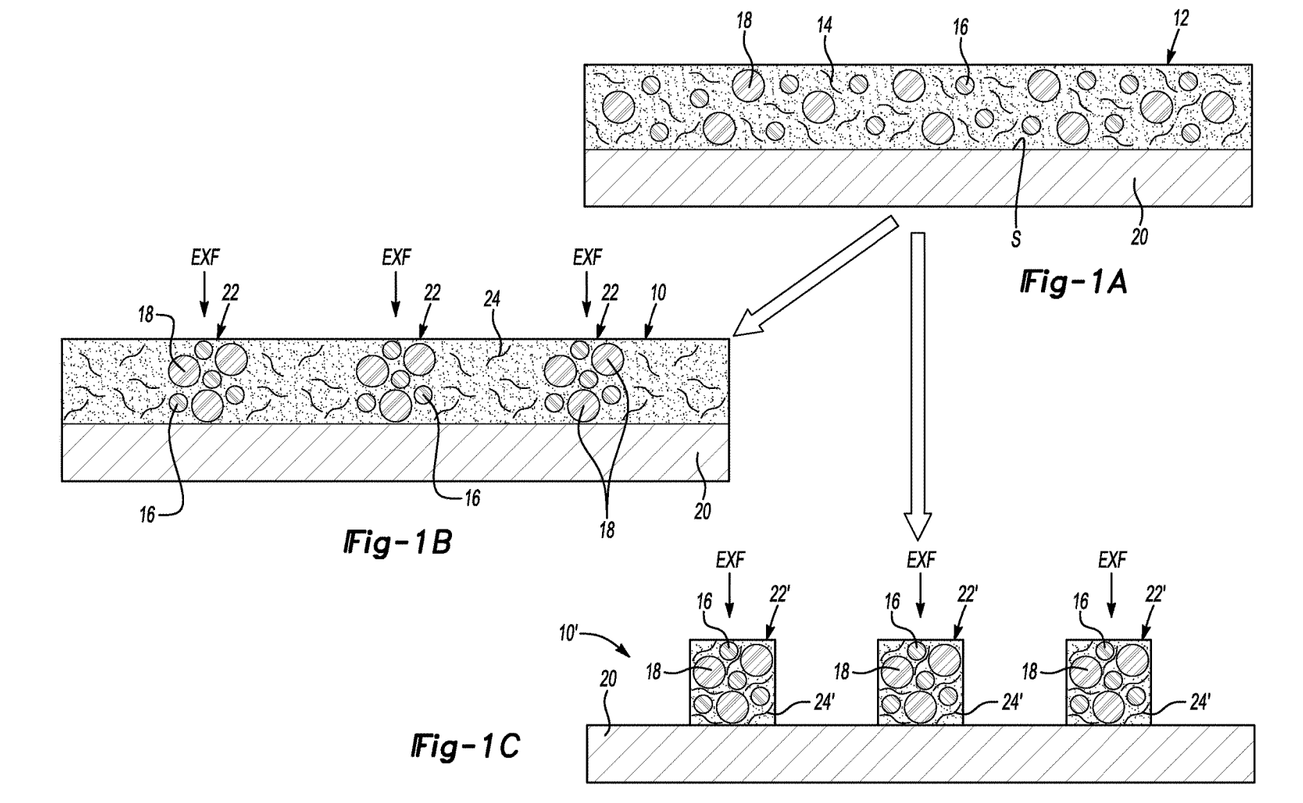
FIGS. 1A through 1C are cross-sectional views illustrating the formation of two examples of the electrode.

Referring now to FIGS. 1A through 1C, two examples of the method for forming two examples of the electrode 10 and 10' are depicted. FIGS. 1A and 1B together illustrate one example method, and FIGS. 1A and 1C together illustrate another example method. The formed battery electrode systems, which include the respective electrodes 10 and 10' on a current collector 20, are shown in FIGS. 1B and 1C.

FIG. 1A illustrates a mixture 12 of a polymer binder 14, a conductive material 16, and an active material 18 deposited on a current collector 20. The current collector 20 used will depend, at least in part, on whether the electrode is an anode or a cathode. In an example when the electrode 10, 10' is an anode, the current collector 20 may be formed from copper, stainless steel, nickel, or any other appropriate electrically conductive material. In an example when the electrode 10, 10' is a cathode, the current collector 20 may be formed from aluminum, titanium, or any other appropriate electrically conductive material.

The mixture 12 may be formed by adding the polymer binder 14, the conductive material 16, and the active material 18 together in any desirable order.

In the examples shown in FIGS. 1A through 1C, the polymer binder 14 is a homopolymer. Any suitable polymer may be selected, including, for example, poly(vinylidene fluoride) (PVDF), styrene-butadiene rubber (SBR), poly (vinyl ester), polyurethane, epoxy polymers, ethylene propylene diene monomer (EPDM) rubber, carboxymethyl cellulose, or the like, or combinations thereof.

The conductive material 16 may include any conductive particles, fibers, etc. Examples of suitable conductive materials include carbon, copper, iron, nickel, titanium, or combinations thereof. The amount of conductive material 16 ranges from about 2 wt % to about 30 wt % of the total electrode mass (excluding the weight of the current collector). The total electrode mass includes the conductive material 16, the active material 18, and the binder 14. In an example, the amount of conductive material 16 is greater than 2 wt % and less than 30 wt % of the total electrode mass. Some conductive materials 16 may also serve as the active material 18. As an example, graphite may be used as the conductive material 16 and the active material 18 in an anode.

The active material 18 that is selected will depend, at least in part, upon whether the electrode 10, 10' is to be an anode or a cathode. When it is desirable to form an anode, the active material 18 may be any lithium host material that can sufficiently undergo lithium intercalation and deintercalation while functioning as the negative terminal of a lithium ion battery (shown as reference numeral 30 in FIG. 3). In an example of when an anode is to be formed, graphite may be used as the active material 18, at least in part because graphite exhibits favorable lithium intercalation and deintercalation characteristics, is relatively non-reactive, and can store lithium in quantities that produce a relatively high energy density. Commercial forms of graphite that may be used as the active material 18 to fabricate a negative electrode are available from, for example, Timcal Graphite & Carbon (Bodio, Switzerland), Lonza Group (Basel, Switzerland), or Superior Graphite (Chicago, Ill.). Other materials can also be used to form the negative electrode including, for example, lithium titanate.

Figure 3:
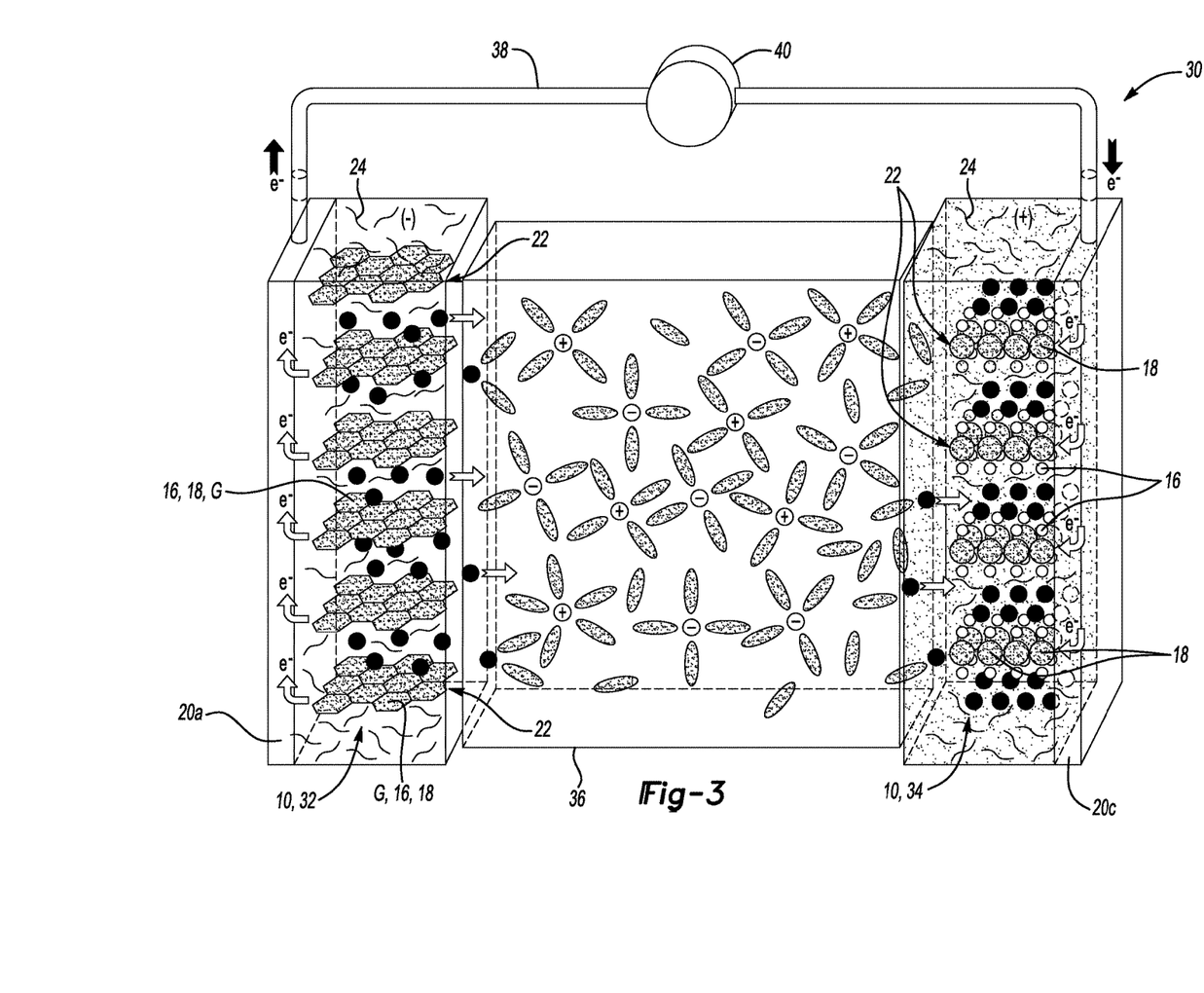
FIG. 3 is a perspective schematic view illustrating an example of a lithium ion battery during a discharging state, where the battery includes an example of a field aligned cathode and an example of a field aligned anode.

When it is desirable to form a cathode, the active material 18 may be any lithium-based active material that can sufficiently undergo lithium intercalation and deintercalation while functioning as the positive terminal of the lithium ion battery 30 (again, shown in FIG. 3). In an example of when a cathode is to be formed, layered lithium transitional metal oxides may be used as the active material 18. For example, the positive electrode active material 18 may include spinel lithium manganese oxide ($LiMn_2O_4$), lithium cobalt oxide ($LiCoO_2$), a nickel-manganese-cobalt oxide [$Li(Ni_xMn_yCo_z)O_2$], or a lithium iron polyanion oxide, such as lithium iron phosphate ($LiFePO_4$) or lithium iron fluorophosphate ($Li_2FePO_4F$). Other lithium-based active materials 18 suitable for forming a positive electrode may include lithium nickel oxide ($LiNiO_2$), lithium aluminum manganese oxide ($Li_xAl_yMn_{1-y}O_2$), and lithium vanadium oxide ($LiV_2O_5$), to name but a few.

The amount of active material 18 ranges from about 50 wt % to about 95 wt % of the total electrode mass (again, excluding the weight of the current collector).

In some instances, the mixture 12 also includes a solvent. The solvent selected will depend, at least in part, on the polymer 14 that is selected for the mixture 12. In general, any organic solvent that dissolves or disperses the selected polymer binder 14 may be used. Examples of solvents include toluene, acetone, dimethyl sulfoxide (DMSO), dimethylformamide (DMF), tetrahydrofuran (THF), and xylene. The amount of solvent will also depend, at least in part, upon how much polymer binder 14 is used. In an example, the amount of solvent ranges from about 5% to about 95% of the total mass of the mixture.

After the mixture 12 is formed, it is deposited onto the surface S of the current collector 20, as shown in FIG. 1A. Any suitable deposition method may be used, including, for example, solvent casting or spin coating. The mixture 12 is then exposed to an external field EXF (FIGS. 1B and 1C) having a field direction that is normal to the current collector surface S. The external field EXF may be an alternating current (AC) magnetic field or an AC electrical field. It is to be understood that the selection of the external field EXF depends, at least in part, upon the conductive filler 16 and the active material 18 that are utilized. If the filler 16 and material 18 are magnetically responsive materials, then a magnetic field may be used to achieve alignment. If, however, the filler 16 and material 18 are electrically responsive materials, then an electric field may be used to achieve alignment. When a magnetic field is utilized, the field strength will depend, at least in part, on the responsiveness of the conductive filler 16 and the active material 18. In an example, the magnetic field strength ranges from about 1 A/m to about $10^6$ A/m. In another example, the electric field strength ranges from about 10 V/m to about $10^7$ V/m.

The AC magnetic field can be generated by passing an alternative current through a solenoidal coil of metal wires. The material to be aligned can be placed inside or outside of the coil, although the field strength is generally higher inside the coil. It is believed that NMR-like magnets may be employed to establish the magnetic field. The AC electrical field can be created by applying an AC voltage onto two conductive plates placed in parallel. The material to be aligned is placed in between the two plates. To create an electric field, other standard methods may be employed. As an example, the 5503 electric field generator from ETS-Lindgren may be used to generate a vertical electric field.

As noted above, the conductive filler 16 and the active material 18 are responsive to the selected external field EXF. When the external AC field EXF is applied, the oscillating field causes the conductive filler 16 and the active material 18 to align themselves in the direction of the applied external field EXF. As shown in FIGS. 1B and 1C, in response to the applied external field EXF, the conductive filler 16 and the active material 18 assemble themselves in a vertical direction (i.e., normal to the current collector surface S) at areas that are exposed to the field lines. The alignment of the filler 16 and material 18 forms discrete (i.e., individual, physically separated, etc.) structures 22 (FIG. 1B) or 22' (FIG. 1C). Each of the discrete structures 22 or 22' contains some of the conductive filler 16 and active material 18 that was present in the original mixture 12. As shown in FIG. 1B, the discrete structures 22 are present within a solidified continuous film 24 of the polymer binder 14. As shown in FIG. 1C, each discrete structure 22' includes some solidified polymer binder 24', but a continuous film is not formed. As such, in the example of FIG. 1C, each structure 22' is spaced apart from each adjacent structure 22'. In an example, the structures 22' resemble a plurality of individual pillars formed on the surface S.

After the applied external field EXF is removed, it is to be understood that the conductive filler 16 and the active material 18 remain in the aligned positions as a result of the solidification of the polymer binder 14. In some instances, curing of the polymer binder 14 solidifies the binder 14 to form the structural support for the discrete structures 22, 22'. In other instances, removal of any solvent that is used solidifies the binder 14 to form the structural support for the discrete structures 22, 22'. In still other instances, curing of the polymer binder 14 and removal of any solvent solidifies the binder 14 to form the structural support for the discrete structures 22, 22'. It is to be understood that it is generally desirable to apply the external field EXF at any time before the polymer binder 14 is completely solidified so that the conductive filler 16 and the active material 18 have sufficient mobility within the matrix to orient themselves. As such, the external field EXF may be applied at any time before the completion of curing and/or solvent removal. In an example, application of the external field EXF takes place prior to any curing and/or solvent evaporation. In another example, curing and/or solvent evaporation takes place while the external field EXF is applied. In still another example, partial curing and/or solvent evaporation may be performed, and then the external field EXF may be applied, and then curing and/or solvent evaporation may be completed.

Curing and/or solvent removal may be accomplished by heating the polymer binder 14, and when present, the solvent. In some instances, curing and/or solvent removal may be accomplished without a thermal stimulus, however, the rate of curing and/or solvent removal may be slower compared to when a thermal stimulus is used. It is to be understood that other curing methods may be used, depending, at least in part upon the polymer binder 14 that is used. Examples of other curing methods include ultraviolet (UV) curing, infrared (IR) curing, or the like.

As illustrated in FIGS. 1B and 1C, two different discrete structures 22, 22' may be formed. The morphology of the structure that is formed depends, at least in part, on the ratio of active material 18 and conductive filler 16 to polymer binder 14, the strength and nature of the applied external field EXF, and the surface tension.

As an example, the electrode 10 shown in FIG. 1B may be formed when a relatively large amount of polymer binder 14 is utilized. The electrode 10 includes the continuous film 24 of the solidified polymer binder 14 having the aligned discrete structures 22 formed therein. To form this electrode 10, the final electrode 10 includes 10% or more of the solidified polymer binder 14. The relatively large amount of polymer binder 14 that is utilized allows the conductive filler 16 and the active material 18 to align in discrete positions within the polymer binder 14, which when solidified, forms the continuous film 24 on the surface S of the current collector 20. As an example, 10% of the binder, up to 15% of the conductive filler, and from 70% to 90% of the active material 18 may be used.

As another example, the electrode 10' shown in FIG. 1C may be formed when a relatively small amount of polymer binder 14 is utilized. The electrode 10' includes the spaced apart discrete structures 22' where little or no polymer binder 14 is present therebetween. To form this electrode 10', the electrode 10' includes from about 90% to about 99% (based upon total parts of the electrode 10') of the conductive filler 16 and the active material 18, and less than 10% of the solidified polymer binder 24'. In this example, the relatively small amount of polymer binder 14 that is utilized aligns with the conductive filler 16 and the active material 18 when exposed to the external field EXF. In this example then, each of the discrete structures 22' includes some of the solidified polymer binder 24'.

Figure 2A:
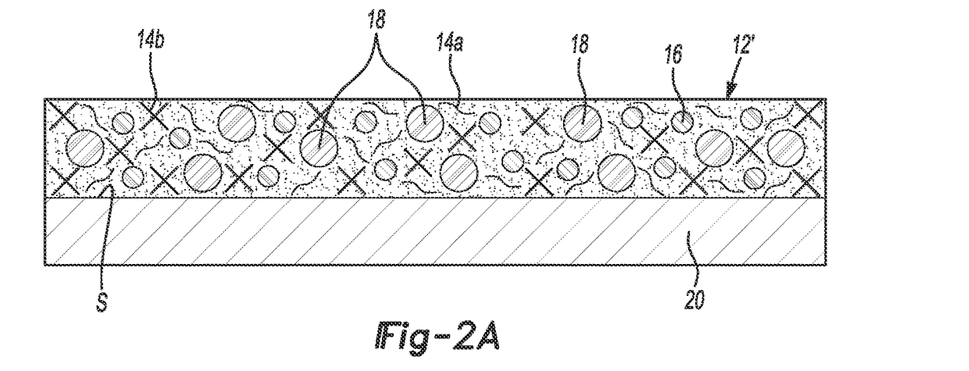
FIGS. 2A and 2B are cross-sectional views illustrating the formation of another example of the electrode.
Figure 2B:
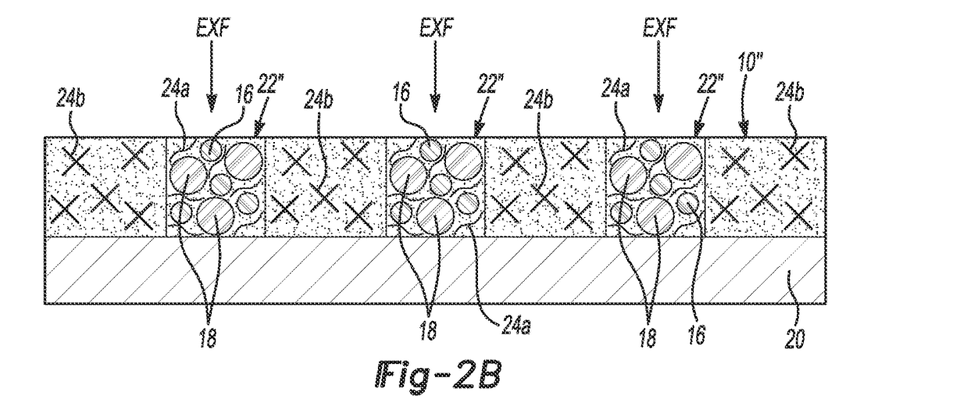

Referring now to FIGS. 2A and 2B, another example of the method for forming another example of the electrode 10" is depicted. The battery electrode system formed via this example of the method, which include the electrode 10" on a current collector 20, is shown in FIG. 2B.

FIG. 2A illustrates another example of the mixture 12'. This mixture 12' includes a block copolymer as the polymer binder 14. The different polymer blocks of the block copolymer are labeled 14a and 14b in FIGS. 2A and 2B. The polymer blocks 14a, 14b are selected to have different miscibility with the conductive filler 16 and the active material 18. More particularly, the conductive filler 16 and active material 18 are miscible with one of the polymer blocks 14a, and the conductive filler 16 and active material 18 are immiscible with the other of the polymer blocks 14b. The polymer blocks 14a, 14b also phase separate to form a spherical, cylindrical, or lamellar morphology. The polymer blocks 14a, 14b are selected so that they phase separate without the addition of another material, an external stimulus, etc. to initiate phase separation. Examples of the polymer blocks 14a, 14b in the block copolymer binder 14 may be any combinations of the following: polystyrene, polybutadiene, polymethacrylates, poly(ethylene oxide), polypropylene oxide), poly(caprolactone), poly(acrylic acid), or other suitable polymers.

The mixture 12' also includes the conductive material 16 and the active material 18. Any of the previous examples of the filler 16 and material 18 may be used in the example shown in FIGS. 2A and 2B. In some instances, the mixture 12' also includes a solvent. The solvent selected will depend, at least in part, on the polymer blocks 14a, 14b that are selected for the mixture 12'. In general, any organic solvent that dissolves the selected polymer blocks 14a, 14b may be used. Examples of solvents are previously described in reference to the examples of FIGS. 1A through 1C.

The mixture 12' may be formed by adding the block copolymer binder 14, the conductive material 16, and the active material 18 together, with or without the solvent, in any desirable order. The mixture 12' is then deposited onto the surface S of current collector 20 using any of the previously mentioned techniques. As mentioned above, the current collector 20 used will depend, at least in part, on whether the electrode is an anode or a cathode. In an example when the electrode 10″ is an anode, the current collector 20 may be formed from copper or any other appropriate electrically conductive material. In an example when the electrode 10″ is a cathode, the current collector 20 may be formed from aluminum or any other appropriate electrically conductive material.

As noted above, the polymer blocks 14a, 14b of the block copolymer binder 14 will phase separate into different domains. Due to the fact that the filler 16 and active material 18 are miscible in one of the polymer blocks 14a and immiscible in the other of the polymer blocks 14b, the filler 16 and active material 18 will naturally move into the polymer block 14a as phase separation occurs.

The deposited mixture 12′ is exposed to an external field EXF (FIG. 2B) having a field direction that is normal to the current collector surface S. The external field EXF may be an alternating current (AC) magnetic field or an AC electrical field. It is to be understood that the selection of the external field EXF depends, at least in part, upon the conductive filler 16 and the active material 18 that are utilized. If the filler 16 and material 18 are magnetically responsive materials, then a magnetic field may be used to achieve alignment. If, however, the filler 16 and material 18 are electrically responsive materials, then an electric field may be used to achieve alignment. When a magnetic field is utilized, the field strength will depend, at least in part, on the responsiveness of the conductive filler 16 and the active material 18. In an example, the magnetic field strength ranges from about 1 A/m to about 106 A/m. In another example, the electric field strength ranges from about 10 V/m to about 107 V/m.

When the external field EXF is applied, the oscillating field causes the conductive filler 16 and the active material 18 to align themselves in the direction of the applied external field EXF. The external field EXF and the filler 16 and active material 18 movement cause the polymer blocks 14a, 14b to assemble perpendicularly (i.e., normal) to the surface S of the current collector 20. As shown in FIG. 2B, in response to the applied external field EXF, the conductive filler 16, the active material 18, and the polymer block 14a in which they are miscible assemble themselves in a vertical direction (i.e., normal to the current collector surface S) at areas that are exposed to the field lines. This alignment process results in the morphology shown in FIG. 2B. In particular, at some point in the process, the polymer blocks 14a, 14b solidify to form solidified blocks 24a, 24b which have been phase separated. The solidified polymer blocks 14a containing the aligned filler 16 and active material 18 form the discrete structures 22″, which are separated by solidified block polymers 24b.

After the applied external field EXF is removed, it is to be understood that the conductive filler 16 and the active material 18 remain in the aligned positions as a result of the solidification of the block polymers 14a, 14b. In some instances, removal of any solvent that is used solidifies the block polymers 14a and 14b to form 24a and 24b, respectively. It is generally desirable to apply the external field EXF at any time before the block polymers 14a, 14b are completely solidified so that the conductive filler 16 and the active material 18 have sufficient mobility within the matrix to orient themselves. As such, the external field EXF may be applied at any time before the completion of solvent removal. Any of the examples previously provided for solvent removal may be used in this example of the method.

In the examples disclosed herein, any number of discrete structures 22, 22′ or 22″ may be formed on the surface S of the current collector 20. In an example, the percentage of surface density of the discrete structures 22, 22′ or 22″ may be up to 95% of the surface S upon which they are formed.

FIG. 3 schematically illustrates an example of a secondary lithium ion battery 30 including an example of the electrode 10 as the cathode or positive electrode 34 and another example of the electrode 20 as the anode or negative electrode 32. The battery 30 generally includes a negative electrode 10, 32, a positive electrode 10, 34, a microporous polymer separator 36 sandwiched between the two electrodes 32, 34, and an interruptible external circuit 38 that connects the negative electrode 10, 32 and the positive electrode 10, 34. Each of the negative electrode 10, 32, the positive electrode 10, 34, and the microporous polymer separator 36 may be soaked in an electrolyte solution capable of conducting lithium ions.

The microporous polymer separator 36, which operates as both an electrical insulator and a mechanical support, is sandwiched between the negative electrode 10, 32 and the positive electrode 10, 34 to prevent physical contact between the two electrodes 32, 34 and the occurrence of a short circuit. The microporous polymer separator 36, in addition to providing a physical barrier between the two electrodes 32, 34, may also provide a minimal resistance to the internal passage of lithium ions (identified by the black dots and by the open circles having a (+) charge in FIG. 3), and related anions (identified by the open circles having a (−) charge in FIG. 3), to help ensure the lithium ion battery 30 functions properly. A negative-side current collector 20$_a$ and a positive-side current collector 20$_c$ may be positioned at or near the anode 10, 32 and the cathode 10, 34, respectively, to collect and move free electrons to and from the external circuit 38.

The lithium ion battery 30 may support a load device 40 that can be operatively connected to the external circuit 38. The load device 40 may be powered fully or partially by the electric current passing through the external circuit 38 when the lithium ion battery 30 is discharging. While the load device 40 may be any number of known electrically-powered devices, a few specific examples of a power-consuming load device include an electric motor for a hybrid vehicle or an all-electrical vehicle, a laptop computer, a cellular phone, and a cordless power tool, to name but a few. The load device 40 may also, however, be a power-generating apparatus that charges the lithium ion battery 30 for purposes of storing energy. For instance, the tendency of windmills and solar panel displays to variably and/or intermittently generate electricity often results in a need to store surplus energy for later use.

The lithium ion battery 30 may include a wide range of other components that, while not depicted here, are nonetheless known to skilled artisans. For instance, the lithium ion battery 30 may include a casing, gaskets, terminal caps, and any other desirable components or materials that may be situated between or around the anode 10, 32, the cathode 10, 34, and/or the microporous polymer separator 36 for performance-related or other practical purposes. Moreover, the size and shape of the lithium ion battery 30 may vary depending on the particular application for which it is designed. Battery-powered automobiles and hand-held consumer electronic devices, for example, are two instances where the lithium ion battery 30 would most likely be designed to different size, capacity, and power-output specifications. The lithium ion battery 30 may also be connected in series and/or in parallel with other similar lithium ion batteries to produce a greater voltage output and current (if arranged in parallel) or voltage (if arranged in series) if the load device 40 so requires.

The lithium ion battery 30 can generate a useful electric current during battery discharge by way of reversible electrochemical reactions that occur when the external circuit 38 is closed to connect the anode 10, 32 and the cathode 10, 34 at a time when the anode 10, 32 contains a sufficiently higher relative quantity of intercalated lithium. The chemical potential difference between the cathode 10, 34 and the anode 10, 32 (approximately 3.7 to 4.2 volts depending on the exact chemical make-up of the electrodes 32, 34) drives electrons produced by the oxidation of intercalated lithium at the anode 10, 32 through the external circuit 38 towards the cathode 10, 34. Lithium ions, which are also produced at the anode 10, 32, are concurrently carried by the electrolyte solution through the microporous polymer separator 36 and towards the cathode 10, 34. The electrons flowing through the external circuit 38 and the lithium ions migrating across the microporous polymer separator 36 in the electrolyte solution eventually reconcile and form intercalated lithium at the cathode 10, 34. The electric current passing through the external circuit 38 can be harnessed and directed through the load device 40 until the intercalated lithium in the anode 10, 32 is depleted and the capacity of the lithium ion battery 30 is diminished.

The lithium ion battery 30 can be charged or re-powered at any time by applying an external power source to the lithium ion battery 30 to reverse the electrochemical reactions that occur during battery discharge. The connection of an external power source to the lithium ion battery 30 compels the otherwise non-spontaneous oxidation of intercalated lithium at the cathode 10, 34 to produce electrons and lithium ions. The electrons, which flow back towards the anode 10, 32 through the external circuit 38, and the lithium ions, which are carried by the electrolyte across the microporous polymer separator 36 back towards the anode 10, 32, reunite at the anode 10, 32 and replenish it with intercalated lithium for consumption during the next battery discharge cycle. The external power source that may be used to charge the lithium ion battery 30 may vary depending on the size, construction, and particular end-use of the lithium ion battery 30. Some suitable external power sources include, but are not limited to, an AC wall outlet and a motor vehicle alternator.

In the example shown in FIG. 3, the anode 10, 32 includes the discrete structures 22, having graphite G as the active material 18 (i.e., the lithium host material that can sufficiently undergo lithium intercalation and deintercalation while functioning as the negative terminal of the lithium ion battery 30) and as the conductive filler 16. The graphene plane within the graphite particles G shown in FIG. 3 has been aligned perpendicular to the current collector 20$_a$ in accordance with a previously applied external field EXF. The discrete structures 22 are embedded in the solidified continuous film 24. While the anode 32 is shown as an example of the electrode 10, it is to be understood that the negative electrode 10, 32 may also be any of the electrodes 10' or 10" shown and described herein. In this example, the current collector 20$_a$ may be copper.

The cathode 34 shown in FIG. 3 is the electrode 10. The cathode 10, 34 includes the discrete structures 22, having the filler 16 and active material 18 aligned in accordance with a previously applied external field EXF. The discrete structures 22 are embedded in the solidified continuous film 24. The cathode 34, 10 is positioned on, for example, an aluminum current collector 20. The anisotropic morphology enables the ionic (Li$^+$ ions) and electronic (electrons, e) conduction to take place along the discrete structures 22 in the direction perpendicular (i.e., normal) to the surface S of the current collector 20.

Any appropriate electrolyte solution that can conduct lithium ions between the anode 32 and the cathode 10, 34 may be used in the lithium ion battery 30. In one example, the electrolyte solution may be a non-aqueous liquid electrolyte solution that includes a lithium salt dissolved in an organic solvent or a mixture of organic solvents. Skilled artisans are aware of the many non-aqueous liquid electrolyte solutions that may be employed in the lithium ion battery 10 as well as how to manufacture or commercially acquire them. A list of example lithium salts that may be dissolved in an organic solvent to form the non-aqueous liquid electrolyte solution include $LiClO_4$, $LiAlCl_4$, LiI, LiBr, LiSCN, $LiBF_4$, $LiB(C_6H_5)_4$ $LiAsF_6$, $LiCF_3SO_3$, $LiN(CF_3SO_2)_2$, $LiPF_6$, and mixtures thereof. These and other similar lithium salts may be dissolved in a variety of organic solvents such as, but not limited to, cyclic carbonates (ethylene carbonate, propylene carbonate, butylene carbonate), acyclic carbonates (dimethyl carbonate, diethyl carbonate, ethylmethylcarbonate), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane), cyclic ethers (tetrahydrofuran, 2-methyltetrahydrofuran), and mixtures thereof.

The microporous polymer separator 36 includes, or in some examples, is a membrane, and this membrane may be formed, e.g., from a polyolefin. The polyolefin may be a homopolymer (derived from a single monomer constituent) or a copolymer (derived from more than one monomer constituent), either linear or branched. If a copolymer derived from two monomer constituents is employed, the polyolefin may assume any copolymer chain arrangement including those of a block copolymer or a random copolymer. The same holds true if the polyolefin is a copolymer derived from more than two monomer constituents. In one example, the polyolefin may be polyethylene (PE), polypropylene (PP), or a blend of PE and PP.

In another example, the membrane of the microporous polymer separator 36 (which may also be referred to herein as simply the microporous polymer separator 36) may be formed from another polymer chosen from polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polyolefin copolymers, acrylonitrile-butadiene styrene copolymers (ABS), polystyrene copolymers, polymethylmethacrylate (PMMA), polyvinyl chloride (PVC), polysiloxane polymers (such as polydimethylsiloxane (PDMS)), polybenzimidazole (PBI), polybenzoxazole (PBO), polyphenylenes (e.g., PARMAX™ (Mississippi Polymer Technologies, Inc., Bay Saint Louis, Miss.)), polyarylene ether ketones, polyperfluorocyclobutanes, polytetrafluoroethylene (PTFE), polyvinylidene fluoride copolymers and terpolymers, polyvinylidene chloride, polyvinylfluoride, liquid crystalline polymers (e.g., VECTAN™ (Hoechst AG, Germany) and ZENITE® (DuPont, Wilmington, Del.)), polyaramides, polyphenylene oxide, and/or combinations thereof. It is believed that another example of a liquid crystalline polymer that may be used for the membrane of the separator 36 is poly(p-hydroxybenzoic acid).

In yet another example, the membrane of the microporous separator 36 may be chosen from a combination of the polyolefin (such as PE and/or PP) and one or more of the polymers for the separator 36 listed above.

The microporous polymer separator 36 may contain a single layer or a multi-layer laminate fabricated from either a dry or wet process. For example, in one example, a single layer of the polyolefin may constitute the entirety of the microporous polymer separator 36 membrane. In another example, a single layer of one or a combination of any of the polymers from which the microporous polymer separator 36 may be formed (e.g., the polyolefin and/or one or more of the other polymers listed above for the separator 36) may constitute the entirety of the separator 36. As another example, however, multiple discrete layers of similar or dissimilar polyolefins and/or polymers for the separator 36 may be assembled into the microporous polymer separator 36. In one example, a discrete layer of one or more of the polymers may be coated on a discrete layer of the polyolefin for the separator 36. Further, the polyolefin (and/or other polymer) layer, and any other optional polymer layers, may further be included in the microporous polymer separator 36 as a fibrous layer to help provide the microporous polymer separator 16 with appropriate structural and porosity characteristics. Skilled artisans will undoubtedly know and understand the many available polymers and commercial products from which the microporous polymer separator 36 may be fabricated, as well as the many manufacturing methods that may be employed to produce the microporous polymer separator 36. A more complete discussion of single and multi-layer lithium ion battery separators, and the dry and wet processes that may be used to make them, can be found in P. Arora and Z. Zhang, "Battery Separators," *Chem. Rev.*, 104, 4424-4427 (2004).

It is to be understood that the ranges provided herein include the stated range and any value or sub-range within the stated range. For example, a range from about 2 wt % to about 30 wt % should be interpreted to include not only the explicitly recited limits of about 2 wt % to about 30 wt %, but also to include individual values, such as 6 wt %, 22 wt %, 28 wt %, etc., and sub-ranges, such as from about 5 wt % to about 25 wt %, from about 10 wt % to about 15 wt %, etc. Furthermore, when "about" is utilized to describe a value, this is meant to encompass minor variations (up to +/−10%) from the stated value.

While several examples have been described in detail, it will be apparent to those skilled in the art that the disclosed examples may be modified. Therefore, the foregoing description is to be considered non-limiting.

The invention claimed is:

1. A method for making a battery electrode system, the method comprising:
depositing a mixture of a polymer binder, active material particles and conductive filler material particles on a current collector; and
exposing the deposited mixture to an external field having a field direction that is normal to a surface of the current collector, thereby aligning, outward from and normal to the surface of the current collector, the active material particles and the conductive filler particles to form an electrode having an anisotropic morphology which includes a plurality of discrete, field aligned structures that extend outward from and normal to the surface of the current collector and are respectively aligned with a field line of the external field, wherein each of the plurality of discrete, field aligned structures includes:
some of the active material particles;
some of the polymer binder; and
some of the conductive filler particles;
wherein each of the active material particles and the conductive filler material particles is in an aligned position within the polymer binder, and the aligned position corresponds with the field line of the external field applied to form the field aligned structures;
wherein the electrode includes from about 90% to about 99% of the active material particles and the conductive filler material particles, and less than 10% of the polymer binder.

2. The method as defined in claim 1 wherein:
the exposing forms the electrode;
the polymer binder is a homopolymer;
the electrode includes from about 90% to about 99% of the active material and the conductive filler, and less than 10% of the polymer binder;
the exposing forms the plurality of discrete structures, each of which includes some of the polymer binder; and
each of the plurality of discrete, field aligned structures is physically separate from each other of the plurality of discrete, field aligned structures.

3. The method as defined in claim 1 wherein:
the polymer binder is a curable polymer;
the mixture further includes a solvent; and
the method further includes:
evaporating the solvent; and
curing the curable polymer.

4. The method as defined in claim 3 wherein the exposing occurs one of:
simultaneously with the evaporating and the curing;
prior to the evaporating and the curing; or
after the evaporating and the curing has been initiated but prior to the evaporating and the curing has been completed.

5. The method as defined in claim 1, further comprising:
choosing a magnetic field or an electric field as the external field; and
choosing an external field strength such that i) when the magnetic field is chosen, the field strength ranges from about 1 A/m to about $10^6$ A/m; or ii) when the electric field is chosen, the field strength ranges from about 10 V/m to about $10^7$ V/m.

6. The method as defined in claim 1 wherein the same material is selected for the active material particles and the conductive filler particles.

7. A battery electrode system, comprising:
a current collector; and
an electrode formed on a surface of the current collector, the electrode having an anisotropic morphology which includes field aligned structures that extend outward from and normal to a surface of the current collector, each of the field aligned structures including:
active material particles;
a polymer binder; and
conductive filler material particles;
wherein each of the active material particles and the conductive filler material particles is in an aligned position within the polymer binder, and the aligned position corresponds with field lines of an external field applied to form the field aligned structures;
wherein the electrode includes from about 90% to about 99% of the active material particles and the conductive filler material particles, and less than 10% of the polymer binder.

8. The battery electrode system as defined in claim 7 wherein the field aligned structures include the polymer binder, and wherein each field aligned structure is separated from an adjacent field aligned structure via a space.

9. The battery electrode system as defined in claim 7 wherein the electrode is a cathode.

10. A battery electrode system, comprising:
a current collector; and
an electrode formed on a surface of the current collector, the electrode having an anisotropic morphology which includes field aligned structures that extend outward from and normal to a surface of the current collector, each of the field aligned structures including:
  active material particles; and
  conductive filler material particles;
wherein:
  the electrode further includes a block copolymer;
  a first polymer of the block copolymer is miscible with, and includes the active material particles and the conductive filler material particles; and
  a second polymer of the block copolymer is immiscible with, and does not include the active material particles and the conductive filler material particles.

11. The battery electrode system as defined in claim 7 wherein the field aligned structures form up to 95% of the electrode.

12. A lithium ion battery, comprising:
a positive electrode, including:
  a current collector; and
  field aligned structures having an anisotropic morphology, that extend outward from and normal to a surface of the current collector, each of the field aligned structures including active material particles, a polymer binder, and conductive filler material particles, wherein each of the active material particles and the conductive filler material particles is in an aligned position within the polymer binder, and the aligned position corresponds with field lines of an external field applied to form the field aligned structures;
  wherein the electrode includes from about 90% to about 99% of the active material particles and the conductive filler material particles, and less than 10% of the polymer binder;
a negative electrode; and
a microporous polymer separator disposed between the negative electrode and the positive electrode.

13. The battery electrode system as defined in claim 10 wherein the active material particles and the conductive filler material particles are graphite.

* * * * *